Oct. 20, 1959     M. M. ARLIN     2,908,980

ELECTRICAL GAUGING APPARATUS

Filed Sept. 16, 1952     3 Sheets-Sheet 1

INVENTOR.
Max M. Arlin.
BY
Harness, Dickey & Pierce
ATTORNEYS

Oct. 20, 1959 — M. M. ARLIN — 2,908,980
ELECTRICAL GAUGING APPARATUS
Filed Sept. 16, 1952 — 3 Sheets-Sheet 2
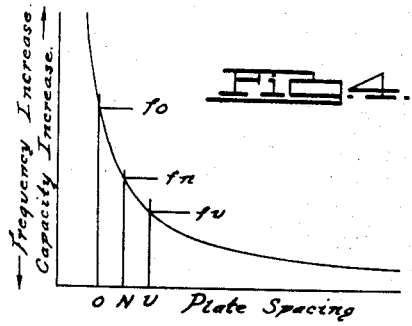
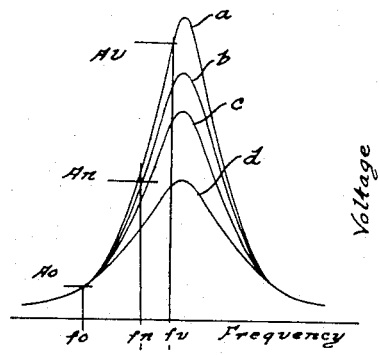
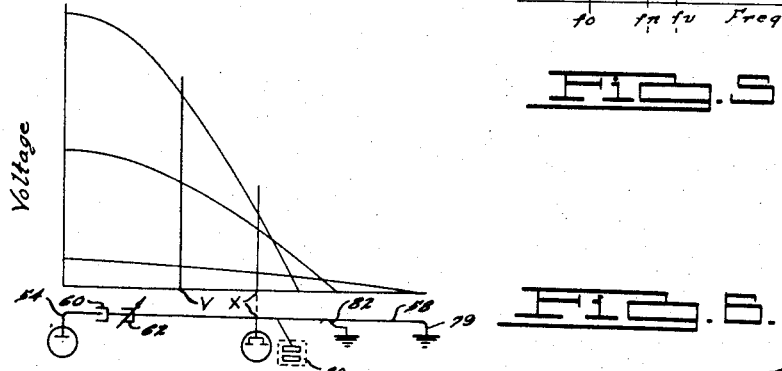
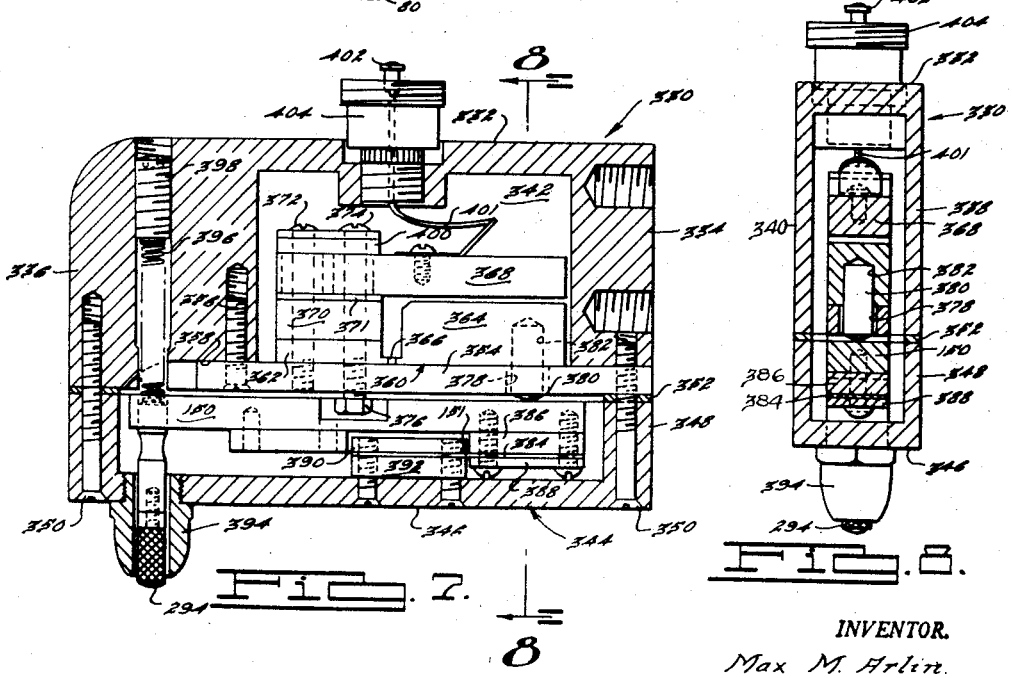
INVENTOR.
Max M. Arlin.
BY
Harness, Dickey & Pierce
ATTORNEYS.

Oct. 20, 1959　　　　M. M. ARLIN　　　　2,908,980
ELECTRICAL GAUGING APPARATUS
Filed Sept. 16, 1952　　　　　　　　　　　　3 Sheets-Sheet 3
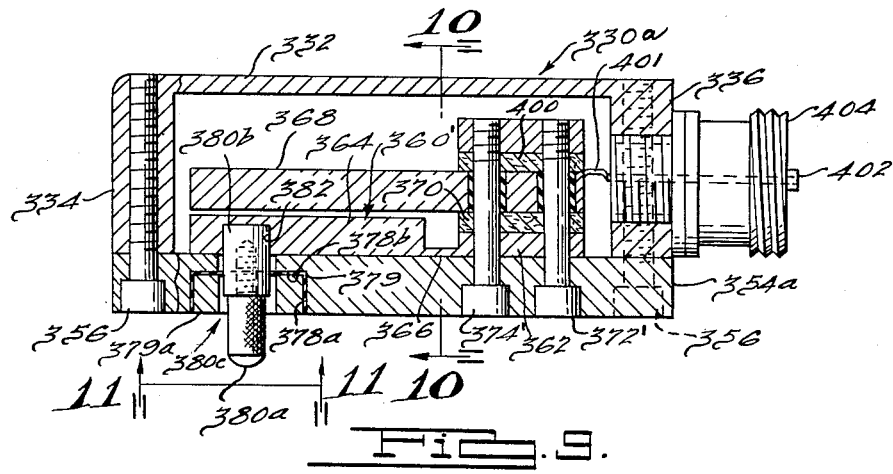
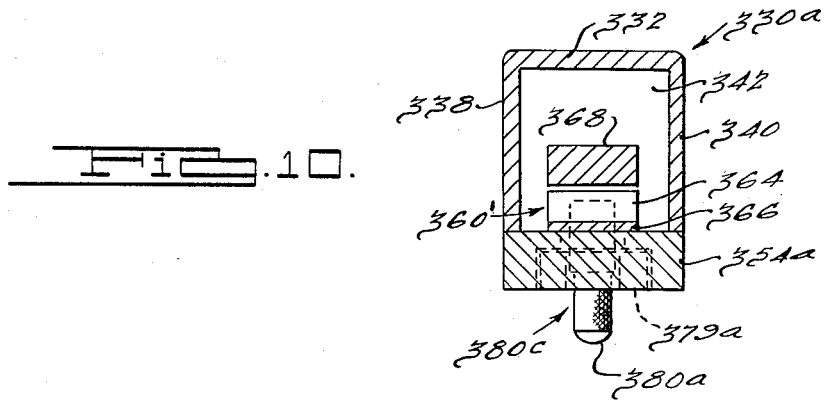
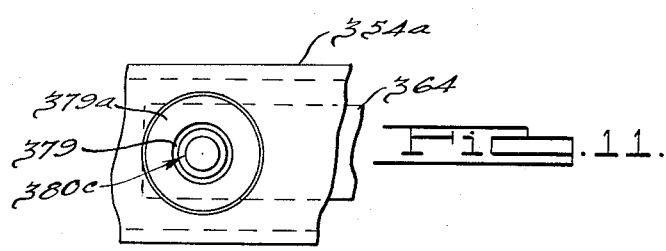
INVENTOR.
Max M. Arlin.
BY
Harness, Dickey & Pierce
ATTORNEYS.

United States Patent Office 2,908,980
Patented Oct. 20, 1959

2,908,980
ELECTRICAL GAUGING APPARATUS
Max M. Arlin, Detroit, Mich.
Application September 16, 1952, Serial No. 309,918
9 Claims. (Cl. 33—172)

The present invention relates to measuring systems, and more particularly to a gauging head for such systems wherein a measurement of a physical characteristic of a workpiece is obtained by enabling such characteristic to determine the value of an impedance included in an electrical network which also includes an electrical measuring instrument. In the specific form disclosed herein, the invention is particularly adapted for electrical gauging physical dimensions of the workpieces and affords an economical and reliable unit for detecting variations in physical dimensions of magnitudes as low as one millionth of an inch.

This application is directed toward the gauging head for actuating the electrical system and is a continuation-in-part of my copending application, Serial No. 756,591, filed June 24, 1947 (issued as Patent 2,635,748, granted April 21, 1953), as a continuation-in-part of application Serial No. 561,020, filed October 30, 1944, for Electric Measuring System, now abandoned. The said application, Serial No. 756,591, fully describes and claims the system, while this application fully describes and claims the gauging head.

The principal objects of the present invention are to provide a new and improved gauging head for operating such an electrical network which is simple in arrangement, economical of manufacture and assembly, accurate and reliable in operation; to provide such a gauging head which will provide a variable impedance which is effective to determine an electrical characteristic of the network and consequently to determine the output of the electrical system; to provide improved constructions of variable condensers by which the impedance of the condenser is an accurate reflection of the magnitude of the workpiece characteristic being examined; to provide an improved gauging head which cooperates in a desired manner with the electrical network to provide a rectilinear output response of the network; and to generally improve the construction and arrangement of apparatus of the above generally indicated character.

With the above as well as other and more detailed objects in view, which appear in the following description and in the appended claims, preferred but illustrative embodiments of the invention are shown in the accompanying drawings, throughout the several views of which corresponding reference characters are used to designate corresponding parts and in which:

Fig. 4 is a graphic representation of a typical condenser capacity curve;

Fig. 5 is a graphic representation of a typical resonance curve;

Fig. 6 is a graphic representation of the standing waves set up by the oscillator and schematically shows its relation to the length of the conductor having the standing wave;

Fig. 7 is a view in substantial central vertical section with certain of the parts in elevation illustrating a modified form of gauging head;

Fig. 8 is a view taken substantially along the line 8—8 of Fig. 7 and looking in the direction of the arrows;

Fig. 9 is a view in substantial central vertical section illustrating a still further form of gauging head;

Fig. 10 is a view taken substantially along the line 10—10 of Fig. 9, and

Fig. 11 is a view taken substantially along the line 11—11 of Fig. 9.

Figure 1:
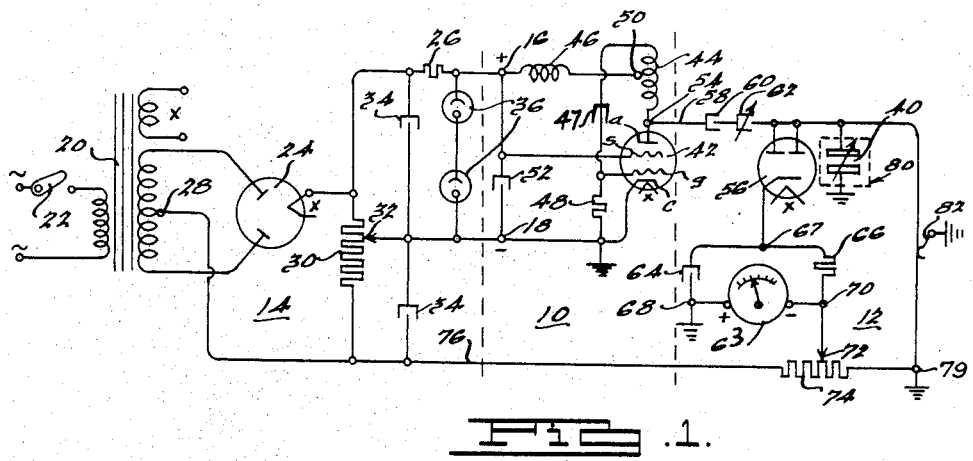
Figure 1 is a diagrammatic view of an electrical control system which may be controlled by the gauging head.

Referring first to Figure 1, the system comprises generally an oscillatory network 10, a measuring network 12, and a source 14 of electrical energy.

The source 14 may be conventionally arranged to impress a substantially uniform direct current E.M.F across the input terminals 16 and 18 of the oscillatory network 10. As shown, the source comprises a supply transformer 20, the primary winding whereof is subject to control by usual control switch 22, and the terminals of the center tapped secondary winding whereof are connected to the anodes of a usual rectifier 24 which may be, for example, of the type known to the trade as a 5Y3 rectifier. The cathode of rectifier 24 is connected through a regulating resistor 26, to terminal 16. The center tap 28 is connected to the cathode of rectifier 24 through a potentiometer resistor 30, tap 32 whereof is connected to terminal 18. A usual filter condenser 34 and a pair of usual glow tube voltage regulating devices 36 are connected across terminals 16 and 18 in usual fashion.

From the foregoing, it will be understood that any variable voltage impressed across the transformer 20 is translated into a substantially uniform direct current E.M.F., for application to the input terminals 16 and 18 of the oscillatory network 10.

The oscillatory network 10 may be of any suitable conventional type, adapted to deliver energy at a suitable high frequency. The present system is primarily designed, as aforesaid, to produce a usable signal in response to changes in physical dimensions ranging in magnitude from a few thousandths of an inch down to one or more millionths of an inch. In order to maintain the physical dimensions of the condenser 40, associated with the hereinafter described gauge head, at practical values accordingly, it is preferred to operate the system at frequencies corresponding to wave lengths of the order of 10 meters or less. In the broader aspects of the invention, considerably lower frequencies are usable. As a specific example, in measuring physical changes of the order of a few thousandths of an inch, an oscillator frequency having a wave length of approximately three meters has been found satisfactory. In measuring smaller physical changes, of the order of one or more millionths of an inch, it has been found desirable to utilize an oscillator frequency of the just-mentioned order, and to tune the measuring circuit 12 to respond to a harmonic of the oscillator frequency.

The illustrated oscillatory network 10 includes a usual oscillator valve 42 of the screen grid type, and which may be, for example, of the type known to the trade as a 6L6 tube. The grounded cathode $c$ of valve 42 is directly connected to terminal 18. The anode $a$ of valve 42 is connected through a portion of a usual tank coil 44, and a usual radio frequency choke 46, to terminal 16. The remaining portion of tank coil 44 is coupled to the control grid $g$ of valve 42 through a condenser 47. Grid $g$ in turn is connected to the cathode through a resistor 48. It will be appreciated that terminal 50 on the tank coil 44 is at the nodal point thereof. The screen grid $s$ of valve 42 is connected to terminal 16 and is also coupled to terminal 18 through a usual filter condenser 52.

With the foregoing arrangement, it will be appreciated that the network 10 translates the input energy applied to terminals 16 and 18, into an oscillatory output, the frequency and amplitude whereof are determined by the magnitudes of the impedances in the network 10 as well as the magnitudes of the impedances included in the measuring network 12. Accordingly, the potential of the oscillator terminal 54 pulsates above and below a reference potential at the just-mentioned frequency.

The measuring network includes a usual diode rectifier 56 which may be, for example, of the type known to the trade as a 6H6 rectifier. The anodes of rectifier 56 are coupled to terminal 54 through a conductor 58, a usual coupling condenser 60, and a variable trimmer or tuning condenser 62. The cathode of rectifier 56 is connected to a usual electric meter 63, in this case a microammeter, through a condenser 64 and a resistor 66. The meter terminal 68 is grounded, and the meter terminal 70 is connected to an intermediate tap 72 on resistor 74. Resistor 74 is connected by a conductor 76 to the supply transformer terminal 28 and to the grounded terminal 79. It will be appreciated therefore that neglecting the energy supplied to meter 63 through rectifier 56, this meter is biased to the indicated polarity by the last-mentioned connections. The initial meter bias may, of course, be adjusted by adjusting the position of tap 72 along resistor 74.

Figure 2:
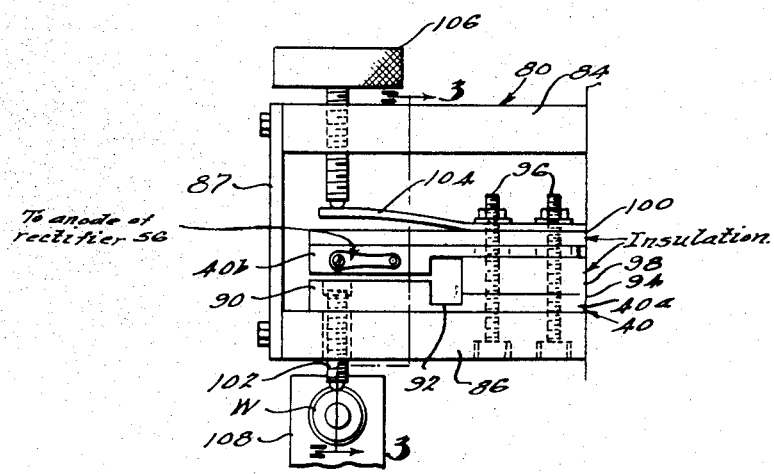
Fig. 2 is a view, partly in section, of a preferred form of gauging head embodying the invention.
Figure 3:
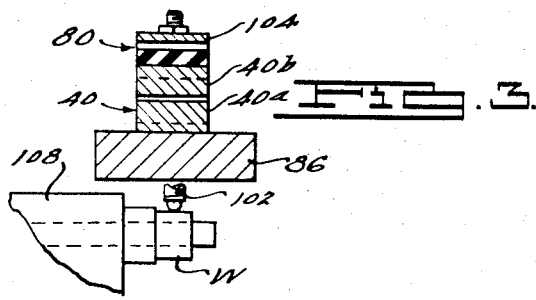
Fig. 3 is a view in section, taken along the line 3—3 of Fig. 2.

One plate of condenser 40, which forms a part of the gauge head 80, shown in Figs. 2 and 3, or any of the other shown gauge heads, is connected directly to the anodes of rectifier 56, and the other plate thereof is directly grounded, in this case through the frame of the gauge head 80. The anodes of rectifier 56 are also directly connected to the grounded terminal 79, and, for the reason mentioned below, an additional adjustable ground connection 82 is provided to variably determine the length of the conductor between such anodes and ground.

Referring now to the gauge head 80, the preferred and illustrated embodiment comprises stationarily supported upper and lower frame members 84 and 86 and a front member 87. The lower condenser plate 40a, which may be formed of steel or equivalent material, comprises a thickened end portion 90, a relatively thin intermediate portion 92, and a somewhat thicker connecting portion 94. The upper plate 40b is similarly constructed except that the intermediate portion and the connecting or clamping portion are shown to be of the same thickness. These plates are rigidly secured to the lower frame member 86 by a plurality of studs 96 which pass through the bodies thereof and which are insulated from at least one of such condenser plates. A spacer block 98 of insulating material is interposed between the right-hand end or connecting portions of the plates, and a similar piece of insulating material 100 overlies the upper plate. The lower plate 40a, which directly overlies and is electrically continuous with the frame member 86, so as to afford the above-mentioned direct ground connection, is suitably formed so as to tend to assume a slightly arched shape, which causes its left-hand end to normally rest upon the corresponding left-hand supporting portion of the frame member 86. Such tendency may be imparted to plate 40a in various ways, for example, by surface grinding the upper surface thereof, as will be understood. A gauge pin 102 is threaded into the plate portion 90 of the lower plate 40a and passes freely through an enlarged opening in the lower frame member 86.

In order to provide an adjustment of the spacing between the effective plate portions of plates 40a and 40b when no workpiece is being engaged, upper plate 40b is surmounted by a resilient springlike member 104 which is connected thereto by studs 96, but is insulated therefrom. An adjusting screw 106 bears against the elevated left-hand end of spring 104. As will be understood, if screw 106 is turned down, it lowers the left-hand end of the spring 104 and applies a pressure to the upper plate member 40b which tends to lower its left-hand end portion and reduce the spacing between the opposed faces of the plate portions of the condenser plates. This adjustment determines the initial capacity of the condenser 40, as will be understood.

In use, the gauge head 80 is stationarily disposed with respect to a cooperating fixed workholder 108 which serves to stationarily support the illustrative workpiece W at a predetermined elevation with respect to the gauge pin 102. The adjustment of the parts is such that with a workpiece W of normal or desired dimensions, such workpiece, when introduced into the holder 108, is engaged by pin 102 and elevates it from its initial position by an amount slightly in excess of the maximum expected variation in workpiece sizes. This action establishes a normal capacity value for condenser 40 which corresponds to the dimensions of the master sample, as will be appreciated. It will further be appreciated that if a slightly smaller workpiece is inserted in the holder 108, gauge pin 102 will be located in a slightly lower position, increasing the spacing between the plates 40a, 40b, thereby decreasing the capacity of condenser 40. Conversely, oversize samples decrease the spacing below the normal value and correspondingly increase the effective capacity of condenser 40.

With respect to the size of the unit, the length of the lower plate 86 is approximately two and one-half inches, the other elements being proportionately sized. As a further example, the normal spacing between the plates may be of the order of five-thousandths of an inch, the minimum and maximum spacings representing departures therefrom equal to the expected variations in dimensions of the workpieces which are to be gauged.

Considering now the operation of the system, it will be appreciated from previous description that the potential, with respect to ground, of the oscillator output terminal 54, pulsates at a frequency which is determined by the impedances of the oscillator and measuring networks, the amplitude of these pulsations being adjustable by adjustment of the condenser 62. It will be understood further that terminal 54 corresponds to a position of substantially maximum amplitude of what appears to be a standing wave established by these pulsations in the conductor 58. The just-mentioned standing wave is of substantially sinusoidal form, as will be understood, intermediate portions whereof, between the peak and the node, are substantially linear. Preferably, the system is adjusted so that throughout the expected operating range, the measuring circuit is subjected to voltage changes which fall within this substantially linear portion of the standing wave. Consequently, in the practice of the invention the length of conductor 58 is such that the anodes of rectifier 56 are electrically spaced from terminal 54 by an amount sufficient to bring these anodes at an intermediate point as, for example, point X (Fig. 6) on the standing wave, between a peak and a node thereof. This region may be in the space between terminal 54 which is, as hereinbefore set forth, a peak point, and the first or a succeeding node. More particularly, a conductor length which establishes a spacing approximately three-quarters of a quarter-wave length is preferred in many cases. In other cases and particularly with systems having linear gauge readings with respect to movement of pin 102, meter locations which are nearer the peak as at V are preferred. Similar comments apply to the connection of the upper plate of condenser 40 with respect to the terminal 54, which terminal is connected to the rectifier anodes immediately adjacent thereto. The potentials of the anode and condenser terminals thus pulsate at the source frequency and at an amplitude determined by their position between a peak and a node of the aforesaid standing wave.

It will further be appreciated that the ground connection 79–82 is spaced from the anodes by an amount sufficient to establish such ground connection in the region of a node of the standing wave, preferably the first node which follows the position of the rectifier-condenser connection.

Current flow in the measuring circuit, as a consequence of the alternating potential applied to the anode terminals, is of course rectified by rectifier 56 and elevates terminal 67 to a value which enables it to overcome the negative bias normally established by the position of tap 72. The adjustment of the circuit is such that a workpiece of desired size establishes an intermediate substantially zero reading on the meter, larger or smaller samples producing corresponding departures to one side or the other of the central position, as will be understood.

It will further be understood that variations in the capacity of condenser 40, as determined by the size of the workpieces, by virtue of its coupling to the oscillator network alter the frequency of the oscillator, thereby changing the wave length of the standing wave produced in conductor 58 and consequently the physical location of the nodes and peaks along this conductor 58. Since the oscillator network 10 always acts to maintain terminal 54 at a peak point, the node points will move closer together and toward terminal 54 with increase in frequency by virtue of the well known formula that the speed of travel of the voltage wave in meters per second is equal to the product of the frequency of the wave in cycles per second multiplied by the length of the wave in meters. The physical location of the anodes of rectifier 56 remain at a fixed physical location on the conductor 58. As the frequency or wave length of the standing wave impressed on conductor 58 is varied by the capacitor or condenser 40, the point on the voltage wave at which the anodes of rectifier 56 are connected will have a higher or lower amplitude voltage change as the relative positions of the physically fixed location of the connection of the anodes of rectifier 56 to the conductor 58 and the standing wave are changed, either toward or away from the peak. This amplitude change is reflected in the amplitude of the voltage applied to, and the current passed by, rectifier 56. The current passed by the rectifier 56 is measured by the microammeter 63. The microammeter 63, therefore, by its indication of the changed current flow, is responsive to the wave length of the standing wave, although it is preferably calibrated not in amperes or meters wave length, but in fractions of an inch above and below a zero reading which is obtained from a workpiece of the desired size.

It will be appreciated that the sensitivity of the measuring circuit is directly proportional to the source frequency. A three-meter wave length can conveniently handle changes in physical dimensions of the order of .0001″. In the event it is desired to measure physical changes of the order of one or more millionths of an inch, it is desirable to use a wave length of one-half meter or less. Oscillators utilizing tubes of the above-described type do not in general operate well at these lower wave lengths, and consequently, in such instances utilizing the illustrated oscillator circuit, it is preferred to tune the measuring circuit so that it responds to either the first or second harmonic of the basic oscillator wave. This tuning is accomplished in the present instance by adjusting the position of the ground connection 82. Adjusting condenser 62 gives a desired amplitude adjustment.

In the original analysis of the before-mentioned circuits, it was believed that the variation in amplitude change of the standing wave indicated by the meter 63 was due primarily to the change in wave length of the standing wave as determined by the condenser 40. Subsequent analysis and more complete laboratory testing now indicate that a better theory of operation is that the variation in the amplitude changes, as indicated by the meter 63, are not only caused by the change in length of the standing wave but furthermore are influenced by a change in amplitude of the impressed standing wave. That there should be changes in the amplitude of the impressed standing wave after analysis seems apparent when reference is had to the usual resonating amplitude characteristic curve as is shown in Fig. 5. In alternating current circuits as the length of the transmission line supplied from an alternating current source, in this case the oscillating network 10, approaches a node point the line approaches what is known as a resonating condition and the amplitude of the impressed alternating voltage will rise substantially above the amplitude which appears under conditions away from resonance in the manner illustrated.

The capacity relationship of a condenser of the type shown and described is qualitatively shown in Fig. 4 and is in accord with the well-known inverse ratio relation of the capacity of a condenser vs. spacing of the condenser plate. Since the frequency of the oscillator network 10 will vary inversely as the change in capacity of the controlling condenser 40, the frequency of the generated voltage cycle will vary proportionally to and in the opposite direction to the capacity change.

The normal spacing of the plates 40a and 40b of the condenser 40 with a workpiece W of the desired dimension is that indicated as N in Fig. 4, and the frequency of the oscillator network 10 will be of a value indicated as $fn$. With a workpiece of a dimension which is undersize substantially the maximum amount expected, the spacing of the condenser plates will be that indicated at U and the corresponding frequency of the network will be $fu$. Likewise, an oversize workpiece of the maximum amount expected will result in a plate spacing O with the corresponding frequency $fo$ of the network 10. The changes in linear distance between the plates 40a and 40b from N to U and N to O are equal, since normally workpieces will tend to be oversize and undersize equal amounts. It will be noted, however, that the change in frequency from $fn$ to $fu$ is substantially less than from $fn$ to $fo$.

Now referring to Fig. 5, wherein curves $a$, $b$, $c$ and $d$ represent the relationships of voltage magnitude plotted against frequency for various values of Q in the standing wave circuit, the frequency values $fu$, $fn$ and $fo$ are indicated in relation to the resonating conditions of the conductor 58 with respect to the maximum values of the standing wave impressed thereon by the network 10, the frequency $fu$ which corresponds most nearly to the resonating frequency of the conductor 58 or in which the node point thereof most closely approaches the location of the ground connection 82 is indicated as having an amplitude of $Au$ units and will of course be adjacent the high point of the resonance curve. Since the resonating diagram is drawn with equal spacing of frequency along its horizontal axis, the frequency $fn$ and $fo$ are spaced therealong in accordance with that determined by the curve of Fig. 4. The intersection of vertical lines drawn upwardly from the points $fn$ and $fo$ with the resonance curve will determine the amplitude of the standing wave impressed on the conductor 58.

Now having determined the wave length and amplitude of the standing waves, they may be drawn as shown in Fig. 6, in which the vertical distance from the base line is indicative of the amplitude of the wave at any distance along the conductor 58 of Fig. 1 to the node point as indicated by ground connection 82. If now the anodes of the rectifier 56 are connected to the point on the conductor 58 as described before, the meter 63 will read the voltage $Xo$, $Xn$, or $Xu$, depending upon the size of the workpiece inserted in the holder 108, and with proper calibration of the meter, the dimension of the workpiece may be indicated. Figure 6 also indicates diagrammatically with respect to the length of the standing wave a representative length of the conductor 58. It is to be understood, however, that the presence of the condensers 40, 60 and 62 will in some respects change the shape of the voltage waves due to a change in the scale of the abscissa caused by their presence. For convenience, the abscissa and ordinate scales have been made linear to better show the sine form of the voltage curves.

Referring to Fig. 7 in which another form of gauge head construction is shown, the numeral 330 designates generally a housing member having a top wall 332, a front wall 334, a rear wall 336, and side walls 338 and 340 and a chambered interior 342 which opens downwardly and outwardly of the casing 330, and is closed by a second casing 344 having a wall 346 with an upwardly extending peripheral flange 348. Screws 350 secure the casing 344 against the open lower side of the casing 330 and a gasket 352 is compressed between the adjacent portions of the casing 330 and the flange 348 whereby the interior chamber 342 of the casing 330 is substantially sealed. A platelike supporting member 354 is held at one end by a screw 356 against a shoulder 358 of the end wall 336 and at the other end by being clamped intermediate the lower edge portion of the wall 334 and the top edge adjacent portion of the flange 348.

The lower condenser plate 360 seats against this supporting bar 354 and is in electrical contact therewith. The lower condenser plate 360 comprises more specifically a rigidly secured end portion 362 and a movable end portion 364 hingedly secured to the rigid portion 362 by means of an integral thin section bridging portion 366. Preferably, the lower condenser plate 360 is fabricated from a single block of metal having the cross section required for the movable portion 364 and which has a portion machined away to provide the rigid portion 362 while it has an intermediate portion thereof machined much further away leaving only the relatively thin flexible bridging portion 366. The fixed condenser plate 368 comprises generally a rectangular block of metal of the same over-all length as is the lower condenser plate 360. The portion of the upper plate 368, which is located above the fixed portion 362 of the lower condenser plate 360, is spaced therefrom by means of a block of insulating material 370 which may be fiber or other similar material. If desired, shims 371 may also be used. The block 370, the fixed portion 362, and the fixed condenser plate 368 have spaced aligned holes through which securing screws 372 and 374 extend. The screw 372, which is closest to the end wall 336, is screw threaded at its lower end portion into the support 354. The other screw 374 extends through a clearance hole in the support 354 and has at its lower end portion a nut 376 for adjusting the tension imparted by this screw. Preferably, the screw 372 is tightened to rigidly secure the rear end portion of the fixed condenser plate 368 relative to the support 354 and the nut 376 is screw threaded on the screw 374 to pivot the fixed member 368 about the screw 372 in a plane through both screws until the proper nonparallel relationship is provided between the lower face of this member 368 and the upper face of the movable portion of the lower condenser plate 360 when the lower surface of the portion 364 is in engagement with the supporting member 354. The supporting member 354 also has an aperture 378 therethrough in which a pin 380 freely extends. The upper end portion of the pin 380 is received within an aperture 382 in the lower face of the movable portion 364 of the lower condenser member 360. The lower end of this pin 380 rests against the upper surface of the lever arm 150 which is located above the wall 346 and within the cavity formed by the upwardly extending flange 348.

The fulcrum point 151 for the lever 150 is provided by a flexible strip 384 which is clamped at one end between blocks 386 and 388 carried by the lever member 150 and at its other end by blocks 390 and 392 carried by the wall 346. The feeler 294 extends downwardly through an aperture in the wall 346 and fitting 394 and is suitably secured as by a press fit with the lever member 150 for reciprocal movement.

The upper end portion of the feeler 294 engages the lower surface of the lever 150 at the opposite end from that engaged by the pin 380 whereby movement thereof will rotate the lever 150 about its fulcrum 151. The wall 336 above the feeler 294 has an aperture which receives a helical coil compression spring 396 which is held under controlled compression by means of a screw threaded plug 398 whereby the lever 150 is continually held in engagement with the upper end portion of the feeler 294. The end wall 334 has spaced screw threaded apertures for reception of screws for securing the gauge head casing 330 to a suitable gauge head supporting base. The lower condenser plate 360 is in electrical connection with the support 354 and the casing 330. The upper condenser plate 368 is insulated from the screws 372 and 374 by suitable means such as an insulated strip 400 and having the apertures therethrough substantially of larger diameter than that of the screws 372 and 374. The plate 368 is electrically connected by a lead 401 to the center contact 402 of a terminal 404 which is screw threaded through the upper wall 332 of the casing 330. One end of the coaxial shielded cable (not shown) is suitably secured to the terminal 404 as by a usual fitting to connect the housing member 330 to the shielding of the cable and the contact 402 to the central lead thereof.

With the arrangement of the flexible member 384 as shown in Fig. 7, the feeler 294 and the pin 380 are provided with one ratio of movement therebetween. It will be obvious that the flexible member 384 may extend in the reverse direction from the supports 390 and 392 and the supports 386 and 388 may be moved downwardly along the lever 150 so that a second or a one-to-one ratio may be provided between the feeler 294 and the pin 380. It has been found from experience that the utilization of either one of these two lever ratios in connection with the condenser plates 360 and 368 will handle substantially all ranges of measurements to be made by the gauge head. It will be obvious, of course, that other ratios on the lever 150 may be established as desired. It is to be further understood that the gauge head of Figs. 7 and 8 may be substituted for the gauge head 80.

Figures 9, 10 and 11 illustrate a gauge head 330a which in many respects is like the head 330 and for that reason corresponding parts are identified by corresponding reference characters as used to designate the same or equivalent parts in head 330, and except where the two heads differ, no detailed description is believed necessary. It this form, the platelike member 354a forms the lower wall of the head 330a and is provided with an aperture 378a which is provided with an outwardly facing shoulder 378b. A pin 380a is screw threaded into an adapter 380b which is suitably secured within an aperture 382 of portion 364 as by press fit or otherwise. The pin 380a and adapter 380b provide a gauging tip 380c for actuation of the movable portion 364 of plate 360. The member 354a except for the aperture 378a completely seals the chamber 342 and if desired a gasket similar to gasket 352 of Fig. 7 could be provided. In gauging work it is essential that the movable condenser plate portion 364 be positionable in exact accordance with the physical dimension of the workpiece being gauged. To do this, all friction due to the rubbing together of parts must be eliminated and therefore the tip 380c must freely extend through the aperture 378a. It is desirable, however, to prevent the entrance of foreign matter into the chamber 342 which might cause corrosion of the parts or deposits on the condenser plates to interfere with the accuracy of the head. To accomplish this, there is provided a thin rubber or neoprene or similar material diaphragm 379 which is provided with a small diameter central aperture which snugly encompasses the outer diameter of the adjacent portion of the gauge tip 380c. As shown, the diaphragm 379 is contacting the adapter 380b so that new pins 380a may be inserted without damage to the diaphragm 379. Preferably the central aperture of the diaphragm is much smaller than the outer diameter of the adapter 380b so that when the adapter is inserted thereinto it snugly engages the adapter. The outer portion of the adapter is held to the adjacent walls of the aperture 378a and against the shoulder 378b by a seal ring 379a which is pressed in place. The diaphragm should be as thin as possible. A thickness of .003 inch has been found to be satisfactory, since it does not interfere with the ability of the condenser plate portion 364 to be moved to respond to changes in workpiece dimensions and is sufficiently flexible to equalize the pressure of the gases within the chamber 342 with atmospheric pressure irrespective of changes in atmospheric pressure or changes in temperature of the gauge head 330a or both.

It will be observed that means are provided for positioning one of the two overlying condenser plates, that the other one of the plates is moved by the provided actuating means, and that stop means (plate 86 in Fig. 2, plate 354 in Fig. 7, or plate 354a in Fig. 9) are provided for that other plate for establishing a limiting slightly divergent position thereof relative to the positioned plate. The term "divergent" is intended to reflect the relationship of the plates in a direction away from the hinge, and the term "slightly" is intended to connote that the relationship exists within the gauging range. The actuating means moves the movable plate, during gauging, through a position in which it is parallel with the positioned plate to a position in which the plates are nonparallel in the opposite sense, that is, they are convergent away from the hinge. When, as herein disclosed, the gauge head is associated with an electrical gauging circuit which produces an output direct voltage having a magnitude which tends to vary curvilinearly with changes in the capacity of the gauge head, the provision of the means for causing the movable plate to move, during gauging, from a diverging to a parallel to a converging relationship with the other plate, provides a compensating effect for the curvilinearity of the gauging circuit so as to provide improved rectilinearity between changes of the movable plate and the resultant changes in the output direct voltage.

Only a limited number of preferred embodiments of the invention have been shown for illustration rather than limitation. It will be appreciated that various other modifications could be made, so that the invention is to be determined by the scope of the hereinafter appended claims.

What is claimed and is desired to be secured by United States Letters Patent is as follows:

1. In a gauging device, a housing having a chamber, a supporting member carried by said housing adjacent said chamber, a first condenser plate member having a relatively massive rigid portion having a surface and having a second rigid portion connected with said massive portion by an integral flexible portion, an insulating spacer adjacent one surface of said second rigid portion, a second integral metallic condenser plate having a surface overlying said massive portion surface but spaced therefrom and having a portion overlying said spacer, clamping means securing said second plate and said spacer and said second portion and said supporting member rigidly together, a second housing adjacent said supporting member, lever means fulcrumed in said second housing, movement transmitting means interconnecting said massive portion and said lever means, said movement transmitting means exerting a force upon said massive portion medially of the width of said massive portion, and means extending outwardly of one of said housings for imparting movement to said lever means and adapted to be controlled by a workpiece.

2. In a condenser, a pair of overlying, massive metallic bar members of substantially equal length forming two electrically insulated spaced surfaces adjacent corresponding one end portions thereof, means mechanically securing said bar members together adjacent opposite corresponding end portions and including insulating means whereby direct current flow between said members is prevented, one of said bar members having an integral section of reduced cross sectional area providing a flexible hinge portion, and means adapted to be actuated by a workpiece for exerting a force on said one bar member end portion medially of the width of said one bar member end portion for flexing said one bar member end portion about said hinge portion whereby the capacity of the condenser may be varied.

3. The combination of claim 2 in which said spaced surfaces are initially arranged in intersecting outwardly flaring planes which intersect in a line parallel to the line about which said one member end portion rotates and in which movement of said one bar member end portion by said workpiece actuated means moves said surfaces into substantial parallel relation.

4. The combination of claim 3 in which said mechanically securing means is adjustable to shift the angular position of the other one of said bar members so as to control the angle between said intersecting planes.

5. A gauge head comprising, a supporting structure, a relatively rigid member providing one plate of a condenser having spaced, integral, solid, thickened portions joined together by a portion of substantially lesser thickness to provide a flexible bridging hinge whereby one of said spaced portions may be moved relative to the other of said spaced portions, said less-thick portion extending the width of said member and having a length which is much shorter than the length of said one spaced portion, means providing a second condenser plate and cooperable with said one spaced portion upon movement thereof for changing the capacity between said condenser plates, means for rigidly securing the other of said spaced portions to said structure, and means for varying the position of said second condenser plate relative to said one plate for adjusting the capacity therebetween.

6. In a variable capacity gauge head associable with electrical circuit means for producing an output direct voltage having a magnitude which tends to vary curvilinearly with changes in the capacity of the gauge head, a pair of relatively movable overlying rigid condenser plates, means for positioning one of said plates, actuating means for moving the other one of said plates toward and away from said one plate, and stop means for said other plate for establishing a limiting slightly divergent position thereof relative to said one plate, said actuating means being operative upon actuation to relatively move said plates from said slightly divergent condition to a parallel condition and then to a second non-parallel condition in which said plates are non-parallel in the opposite sense to said first slightly divergent condition whereby to progressively vary the capacity between said plates in a single direction but at varying rates as a consequence of a constant rate of actuation of said actuating means so as to provide rectilinearity between changes in said actuating means and the resultant changes in said direct voltage, said parallel condition existing near the midpoint of the overall movement of said actuating means.

7. In a variable capacity gauge head associable with electrical circuit means for producing an output direct voltage having a magnitude which tends to vary curvilinearly with changes in the capacity of the gauge head, a first rigid condenser plate having a flexible section intermediate its ends, a second relatively inflexible condenser plate arranged in overlying relation to said first plate, means securing first corresponding end portions of said plates together in electrically insulating arrangement, said securing means including stop means and acting to space said first corresponding end portions at such a distance from each other and at such an angle with respect to the normal unflexed position of said first plate other end portion that said corresponding other end portions are in a slightly divergent condition, and actuating means for moving said first plate other portion to change the distance between said other corresponding end portions of said plates and for flexing said first plate other end portion about said flexible section through a position in which said corresponding opposite end portions are parallel to a position in which said corresponding opposite end portions are non-parallel in the opposite sense to said first mentioned slightly divergent condition so as to provide improved linearity between changes in said actuating means and the resultant changes in said direct voltage, said parallel condition existing near the midpoint of the overall movement of said actuating means.

8. In a gauging device, the combination of a pair of oppositely disposed, relatively massive plates, at least one of said plates comprising a plurality of electrically and mechanically integral and unitary portions including a pair of massive, solid, relatively rigid portions separated by a slightly resilient portion to permit relative rotational movement of said relatively rigid portions about an axis, a support member, means for clamping one of said rigid portions of said one plate to said support member, means for supporting the other one of said plates so that one surface thereof is disposed in spaced proximity to a surface of said other rigid portion, and means acting upon the other one of said rigid portions for varying the spacing between the plates, said last-mentioned means engaging said other rigid portion medially of the width of said portion and having means adapting it for engagement and movement by an associated workpiece.

9. In a gauging device for measuring a workpiece, the combination of a pair of spaced apart metallic plates presenting substantially planar face surfaces toward one another, means supporting one of said plates for rotation about an axis parallel with one of said surfaces, means engageable with a workpiece and engaging said one plate for rotating said one plate about said axis relative to the other plate, means supporting said other plate for limited rotation relative to said one plate, and means for rotating said other plate to adjust the spacing between said plates.

References Cited in the file of this patent

UNITED STATES PATENTS

| | | |
|---|---|---|
| 1,520,329 | Cherpeck | Dec. 23, 1924 |
| 1,631,019 | Darlington | May 31, 1927 |
| 1,684,461 | Van Deventer | Sept. 18, 1928 |
| 1,735,532 | Dubilier | Mar. 12, 1929 |
| 1,835,807 | Parker | Dec. 8, 1931 |
| 1,999,075 | Bauer | Apr. 23, 1935 |
| 2,004,361 | Arms et al. | June 11, 1935 |
| 2,076,944 | Howe | Apr. 13, 1937 |
| 2,146,442 | Price | Feb. 7, 1939 |
| 2,164,638 | Broeze et al. | July 4, 1939 |
| 2,179,068 | Sprague | Nov. 7, 1939 |
| 2,208,931 | Ketcham | July 23, 1940 |
| 2,288,053 | Walter | June 30, 1942 |
| 2,350,432 | Verderber | June 6, 1944 |
| 2,384,519 | Aller | Sept. 11, 1945 |
| 2,401,527 | Vance | June 4, 1946 |
| 2,465,288 | Sinnett | Mar. 22, 1949 |
| 2,543,570 | Eder | Feb. 27, 1951 |
| 2,589,141 | Rosser | Mar. 11, 1952 |

FOREIGN PATENTS

| | | |
|---|---|---|
| 505,233 | France | July 26, 1920 |
| 970,331 | France | June 14, 1950 |
| 530,266 | Great Britain | Dec. 9, 1940 |